(12) United States Patent
Xie et al.

(10) Patent No.: US 11,928,761 B2
(45) Date of Patent: Mar. 12, 2024

(54) METHOD FOR IDENTIFYING K-LINE FORM AND ELECTRONIC DEVICE

(71) Applicant: FUTU NETWORK TECHNOLOGY (SHENZHEN) CO., LTD., Guangdong (CN)

(72) Inventors: Xin Xie, Guangdong (CN); Zheng Pei, Guangdong (CN); Jinhui Hu, Guangdong (CN)

(73) Assignee: FUTU NETWORK TECHNOLOGY (SHENZHEN) CO., LTD, Guangdong (CN)

( * ) Notice: Subject to any disclaimer, the term of this patent is extended or adjusted under 35 U.S.C. 154(b) by 0 days.

(21) Appl. No.: 17/901,799

(22) Filed: Sep. 1, 2022

(65) Prior Publication Data
US 2023/0169705 A1 Jun. 1, 2023

Related U.S. Application Data

(63) Continuation of application No. PCT/CN2021/122220, filed on Sep. 30, 2021.

(51) Int. Cl.
*G06T 11/20* (2006.01)
*G06Q 40/04* (2012.01)

(52) U.S. Cl.
CPC ............ *G06T 11/206* (2013.01); *G06Q 40/04* (2013.01)

(58) Field of Classification Search
CPC . G06F 3/04883; G06F 3/04845; G06Q 40/04; G06T 11/206
USPC ........................................... 345/158; 715/767
See application file for complete search history.

(56) References Cited

U.S. PATENT DOCUMENTS

| 2002/0120551 A1* | 8/2002 | Jones, III | ............... | G06Q 40/04 705/37 |
| 2016/0048918 A1* | 2/2016 | Chen | ...................... | G06Q 40/04 705/37 |
| 2017/0069025 A1* | 3/2017 | Chen | ...................... | G06Q 40/04 |

(Continued)

FOREIGN PATENT DOCUMENTS

| CN | 105701450 A | 6/2016 |
| CN | 106447494 A | 2/2017 |
| CN | 107958415 A | 4/2018 |

(Continued)

OTHER PUBLICATIONS

International Search Report dated Jun. 23, 2022 in International Application No. PCT/CN2021/122220.

(Continued)

*Primary Examiner* — Calvin C Ma

(57) ABSTRACT

The present disclosure relates to computer technology, and provides a method for identifying a K-line form and an electronic device. The method includes: obtaining, by a terminal device, data of N1 K-lines of a first stock in a first time window, where N1 is an integer greater than 1; obtaining, by the terminal device, a first target form corresponding to the data of the N1 K-lines and x key K-lines in, the data of the N1 K-lines, the first target form indicating a K-line form of the data of the N1 K-lines, where x≤N1; displaying, by the terminal device, the N1 K-lines corresponding to the data of the N1 K-lines and drawing, by the terminal device, a first target form line on the N1 K-lines based on the first target form and the x key K-lines.

18 Claims, 6 Drawing Sheets

(56) References Cited

U.S. PATENT DOCUMENTS

2021/0035213 A1    2/2021  Kim et al.

FOREIGN PATENT DOCUMENTS

| CN | 108364231 A | 8/2018 |
| CN | 108765146 A | 11/2018 |
| CN | 110415116 A | 11/2019 |
| CN | 112257770 A | 1/2021 |
| CN | 113269643 A | 8/2021 |
| JP | 2002049747 A | 2/2002 |
| WO | 2021024205 A1 | 2/2021 |

OTHER PUBLICATIONS

First Office Action dated Dec. 19, 2023 received in patent family application No. JP2022-562395. English translation attached.

\* cited by examiner

METHOD FOR IDENTIFYING K-LINE FORM AND ELECTRONIC DEVICE

CROSS-REFERENCE TO RELATED APPLICATION

The present application is a continuation of International Application No. PCT/CN2021/122220, filed on Sep. 30, 2021, which is hereby incorporated by reference in its entirety

TECHNICAL FIELD

The embodiments of the present disclosure relate to computer technology field, and more particularly, to a method for identifying a K-line form and an electronic device.

BACKGROUND

In the financial sector, K-lines (or K-line charts) of stocks can reflect changes in stock prices over a period of time. At present, stock software can push K-line charts to users based on stock price data at various time points, such that the users can learn information on opening prices, highest prices, lowest prices, and current prices in the stock market and futures market. However, such K-line chart is simply a list of information. With the accumulation of time and the number of stocks, it is difficult for the users to make decisions when faced with a large number of K-line charts, which reduces the reference value of the K-line charts and results in a poor user experience.

In other words, the existing K-line charts can only simply display the stock price data at various time points for the users, and the introduced line drawing function can only support a connecting line between two points, which has a limited reference value and results in a poor user experience.

SUMMARY

The embodiments of the present disclosure provide a method identifying a K-line form and an electronic device, capable of solving, to a certain extent, the problem that the existing K-line charts are relatively simple, that is, they can only provide users with simple visual information division functions, and the introduced line drawing function can only support a connecting line between two points, which has a limited reference value and results in a poor user experience.

In a first aspect, a method for identifying a K-line form is provided. The method includes: obtaining, by a terminal device, data of N1 K-lines of a first stock in a first time window, where N1 is an integer greater than 1; obtaining, by the terminal device, a first target form corresponding to the data of the N1 K-lines and x key K-lines in the data of the N1 K-lines, the first target form indicating a K-line form of the data of the N1 K-lines, where x≤N1; displaying, by the terminal device, the N1 K-lines corresponding to the data of the N1 K-lines; and drawing, by the terminal device, a first target form line on the N1 K-lines based on the first target form and the x key K-lines.

In a second aspect, a method for identifying a K-line form is provided. The method includes: obtaining, by a server, data of N1 K-lines of a first stock in a first time window, where N1 is an integer greater than 1; analyzing, by the server, a corresponding first target form and x key K-lines in the data of the N1 K-lines based on the data of the N1 K-lines, the first target form indicating a K-line form of the data of the N1 K-lines, where x≤N1; and transmitting, by the server, the data of the N1 K-lines, the first target form, and identifications of the x key K-lines to a terminal device.

In a third aspect, a terminal device is provided. The terminal device includes: an obtaining unit configured to obtain data of N1 K-lines of as first stock in a first time window, where N1 is an integer greater than 1, and obtain a first target form corresponding to the data of the N1 K-lines and x key K-lines in the data of the N1 K-lines, the first target form indicating to K-line form of the data of the N1 K-lines, where x≤N1; and a display unit configured to display the N1 K-lines corresponding to the data of the N1 K-lines, and draw a first target form line on the N1 K-lines based on the first target form and the x key K-lines.

In a fourth aspect, a server is provided. The server includes: an obtaining unit configured to obtain data of N1 K-lines of a first stock in a first time window, where N1 is an integer greater than 1; an analyzing unit configured to analyze a corresponding first target form and x key K-lines in the data of the N1 K-lines based on the data of the N1 K-lines, the first target form indicating a K-line form of the data of the N1 K-lines, where x≤N1; and a communication unit configured to transmit the data of the N1 K-lines, the first target form, and identifications of the x key K-lines to a terminal device.

In a fifth aspect, a terminal device is provided. The terminal device includes a processor and a memory. The memory is configured to store a computer program, and the processor is configured to invoke and execute the computer program stored in the memory to perform the method according to the first aspect or respective implementations thereof.

In a sixth aspect, a server is provided. The network device includes a processor and a memory. The memory is configured to store a computer program, and the processor is configured to invoke and execute the computer program stored in the memory to perform the method according to the second aspect or respective implementations thereof In a seventh aspect, a computer-readable storage medium is provided. The computer-readable storage medium is configured to store a computer program that enables a computer to perform the method according to the first aspect, the second aspect, or respective implementations thereof.

In an eighth aspect, a computer program product is provided. The computer program product includes computer program instructions that cause a computer to perform the method according to the first aspect, the second aspect, or respective implementations thereof.

In a ninth aspect, a computer program is provided. The computer program causes a computer to perform the method according to the first aspect, the second aspect, or respective implementations thereof.

The embodiments of the present disclosure have the following technical effects:
1) Hierarchical processing can be provided from the algorithm perspective, and the computational complexity can be reduced while ensuring a large number of K-line form models, leading to shorter calculation time and higher accuracy.
2) The user is allowed to select a suitable time window to determine the K-line form, which has high flexibility. At the same time, the time dimension is also taken into account in the models, which makes the result more accurate.

3) The K-line contour can be identified more effectively, and the K-line and visual identification can be combined effectively, which is more consistent with the user's visual experience.
4) The similarities of matching between multiple forms can be generated, and the identification results can be more similar than those in the conventional solutions, and the matching weights of the similarities can be adjusted according to user feedback to optimize the matching results
5) When the user clicks on the target form line on the terminal device, detailed information and prompt information corresponding to the target term line will pop up, which significantly improves the user experience and enhances the reference value of the K-line chart.

Additional aspects and advantages of the present disclosure will be given at least in part in the following description, or become apparent at least in part from the following description, or can be learned from practicing of the present disclosure.

DESCRIPTION OF EMBODIMENTS

The technical solutions in the embodiments of the present disclosure will be described below with reference to the figures in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

In the following, several concepts that will be involved in the embodiments of the present disclosure will be explained first.

The K-line is a columnar line composed of shadow lines and a body, for reflecting changes in a stock price over a period of time. Here, the shadow lines indicate the highest and lowest prices of transactions in a current day, and the body indicates the opening and closing prices in a current day.

Depending on calculation periods of K-lines, they can be divided into daily K-lines, weekly K-lines, monthly K-lines, annual K-lines, and so on. For example, a weekly K-line refers to a K-line chart drawn based on the opening price on Monday, the closing price on Friday, the highest price of the week, and the lowest price of the week. Similarly, the daily K-line refers to a K-line chart drawn based on the opening price of the day, the closing price of the day, the highest price of the day, and the lowest price of the day, A K-line form, or known as combined form of K-lines, refers to a trend of K-lines (such as daily K-lines) over a period of time. For example, the K-line form can be three red soldiers, arc bottom, V-shaped bottom, reversal doji, W-shaped bottom, etc. The K-line form is one of the important references for determining the trend and direction of the market operation.

Currently, stock software can display K-lines of a certain stock to a user on an electronic device, such as 100 daily K-lines for the last 100 days, 10 weekly K-lines for the last 10 weeks, and so on. However, the user needs to determine the K-line form by himself/herself based on the displayed K-lines, and then make decisions such as buying and selling. For most users with insufficient financial knowledge, it is difficult to make decisions when faced with a large number of K-line charts, which reduces the reference value of K-line charts and results in poor user experience.

Figure 1:
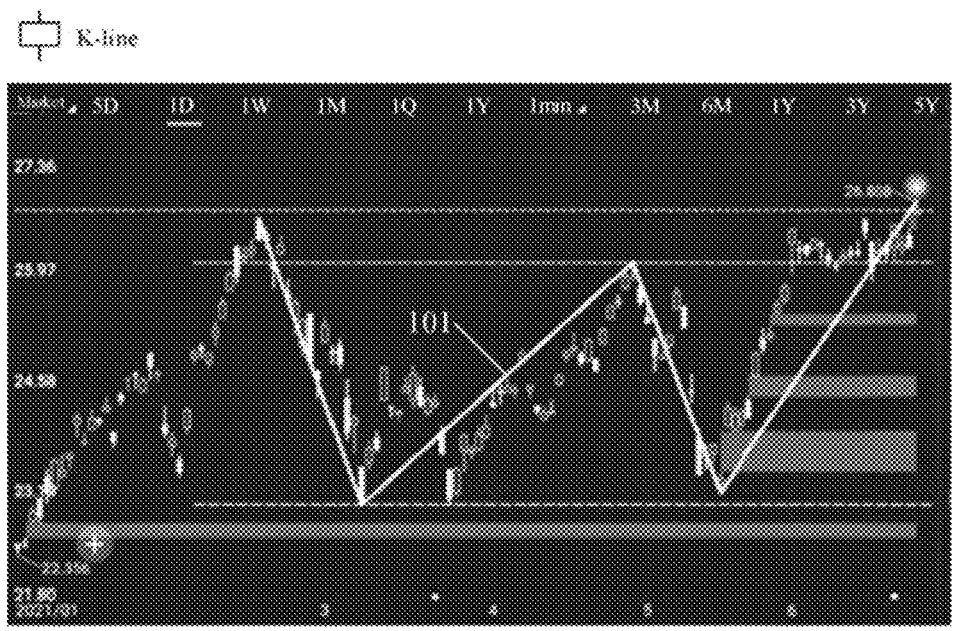
FIG. 1 is a schematic diagram showing an application scenario of a method for identifying a K-line form according to the present disclosure.

In this regard, the inventive concept of the present disclosure is as follows. When an electronic device needs to display N (N is an integer greater than 1) K-lines within a certain period of time, the electronic device can interact with a server on a network side to trigger the server to analyze a target form for the above N K-lines. Subsequently, as shown in FIG. 1, when the electronic device displays the above N K-lines, the server can instruct the electronic device to draw the corresponding target form line 101 on the displayed N K-lines based on the above target form. It is convenient for the user to learn the current K-line form intuitively and accurately, thereby facilitating the user's decision-making, enhancing the user experience and the reference value of the K-lines.

The method for identifying a K-line form according to the present disclosure can be applied in an electronic device and/or a server. The electronic device can be any terminal device, such as a smart phone, a tablet computer, a notebook computer, a desktop computer, a smart speaker, a smart watch, etc., but the present disclosure is not limited to any of these examples. The server may be an independent physical server, a server cluster or a distributed system composed of multiple physical servers, or a cloud server that provides cloud computing services. The terminal and the server can be directly or indirectly connected with each other by means of wired or wireless communication. When the electronic device is a server, the connected terminal can receive a user operation and generate an instruction, and then the server can perform data processing according to the instruction from the terminal. The present disclosure is not limited to any of these examples.

Figure 2:
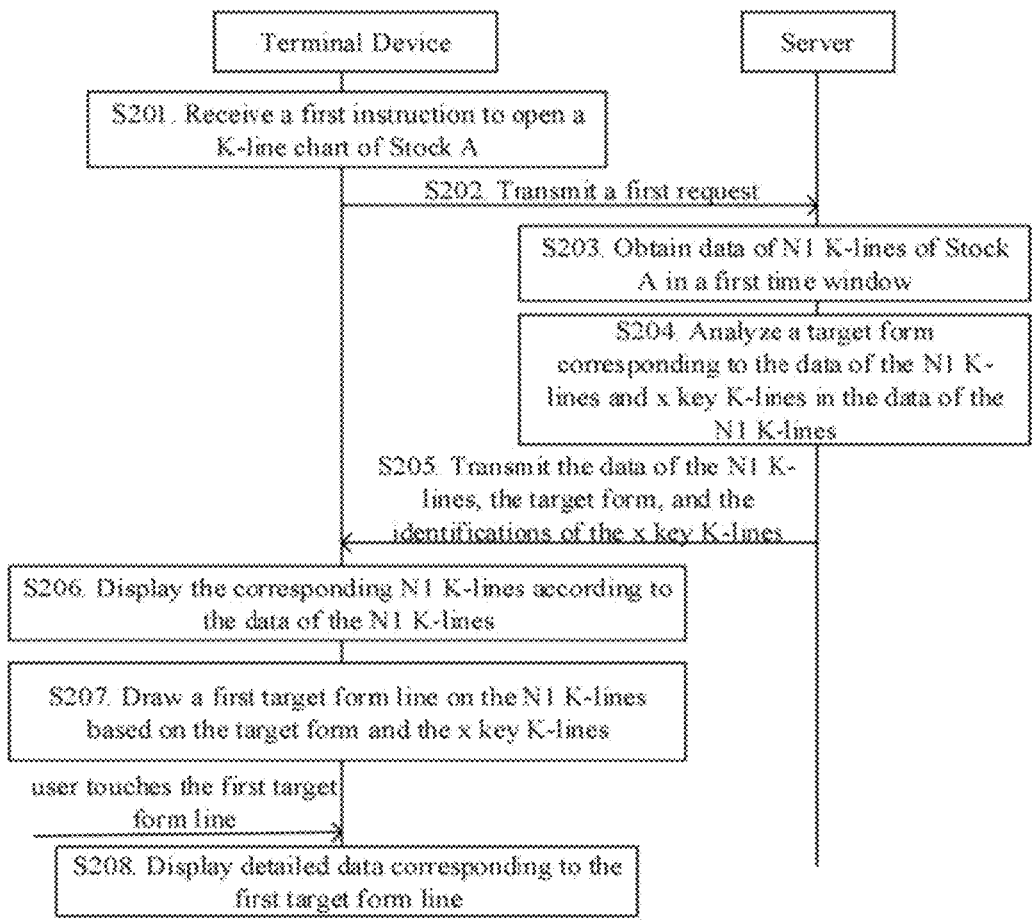
FIG. 2 is a schematic diagram showing interactions in a method for identifying a K-line form according to the present disclosure.

The technical solutions according to the embodiments of the present disclosure will be described in detail below:

FIG. 2 is a schematic diagram showing interactions in a method for identifying a K-line form according to an embodiment of the present disclosure. As shown in FIG. 2, the method includes the following steps.

At S201, a terminal device receives a first instruction to open a K-line chart of Stock A.

Exemplarily, stock software (or application) may be installed on the terminal device. When the terminal device is executing the stock software, it may receive an instruction to open a K-line chart of a certain stock (that is, the first instruction).

Figure 3:
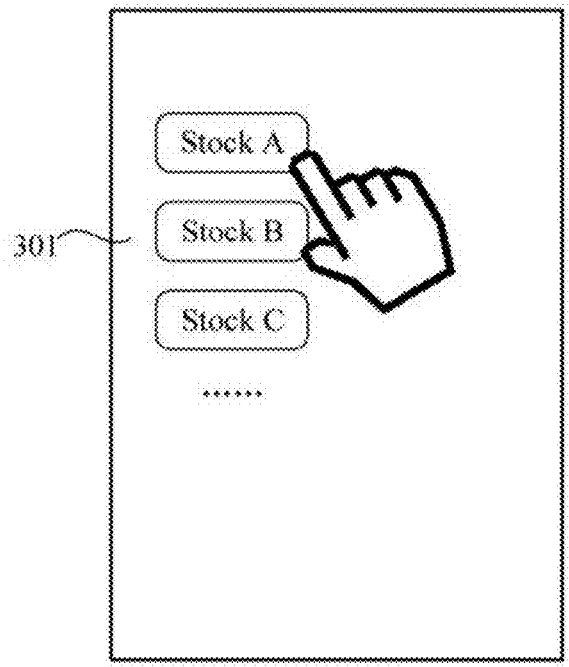
FIG. 3 is a schematic diagram showing an application scenario of another method for identifying a K-line form according to an embodiment of the present disclosure.

For example, as shown in FIG. 3, the terminal device may display a list 301 of a plurality of stocks when executing the stock software. Upon detecting that a user is opening a certain stock (for example, Stock A), the terminal device may generate a first instruction to open the K-line chart of Stock A.

Alternatively, the stock software can regularly push the K-line chart(s) of one or more stocks on the terminal device. For example, when Stock A closes every day, the server may transmit to the terminal device a first instruction to open the K-line chart of Stock A.

That is, the scenario in which the terminal device opens the K-line chart of a certain stock can be triggered in response to a specific input operation by the user or in response to a specific input from the server, or can be triggered automatically by the terminal device. The embodiment of the present disclosure is not limited to any of these examples.

At S202, in response to the first instruction, the terminal device transmits a first request to the server. The first request includes an identification of Stock A and a first time window.

Again, in the example of opening the K-line chart of Stock A, when the terminal device obtains the first instruction to open the K-line chart of Stock A, the terminal device can determine the time period for which the K-line chart needs to be displayed in this case, i.e., the first time window. For example, if it is needed to display , the K-line chart for the last 30 days, the first time window may be 30 days. For another example, if it is needed to display the K-line chart for the last 60 days, the first time window may be 60 days.

Exemplarily, when the terminal device opens the K-line chart of Stock A for the first time, it can request the server to display the K-line chart of Stock A in the first time window based on a default first time window (for example, the last 100 days).

Then, after the terminal device determines the first time window, it can carry the first time window and the identification of Stock A in the first request and transmit it to the server to request the server to display the K-line chart of Stock A in the first time window.

Optionally, the terminal device may timber carry a type of the K-line chart that needs to be displayed in the first request, e.g., a daily K-line type, a weekly K-line type, etc.

At S203, the server obtains data of N1 K-lines of Stock A in the first time window, where N1 is an integer greater than 1.

After the server obtains the first request transmitted by the terminal device, since the first request carries the identification of Stock A and the first time window, the server can obtain the data of the N1 K-lines in the first time window based on the identification of Stock A. Taking the daily K-line as an example, the data of each K-line may include data such as an opening price, a closing price, a highest price, and a lowest price of a current day. The data of the N1 K-lines can be used by the terminal device to draw a corresponding K-line chart based on the data of each K-line.

At S204, the server analyzes a target form corresponding to the data of the N1 K-lines and x key K-lines in the data of the N1 K-lines, where x<N1.

In an embodiment of the present disclosure, after the server obtains the first request transmitted by the terminal device, in addition to obtaining the data of the N1 K-lines of Stock A in the first time window, it can also determine a target form corresponding to the data of the N1 K-lines, such as W form, arc bottom form, etc. Further, the server can also determine the x key K-lines corresponding to the target form in the data of the N1 K-lines, and the connecting line of the x key K-lines can present the above target form.

Exemplarily, the server may first extract data of a (where a is an integer greater than 1) inflection points from the data of the N1 K-lines, that is, data of K-line(s) with relatively high stock price(s) and data of K-line(s) with relatively low stock price(s) in the first time window. Here, the stock price can refer to the opening price, closing price, highest price or lowest price.

Figure 4:
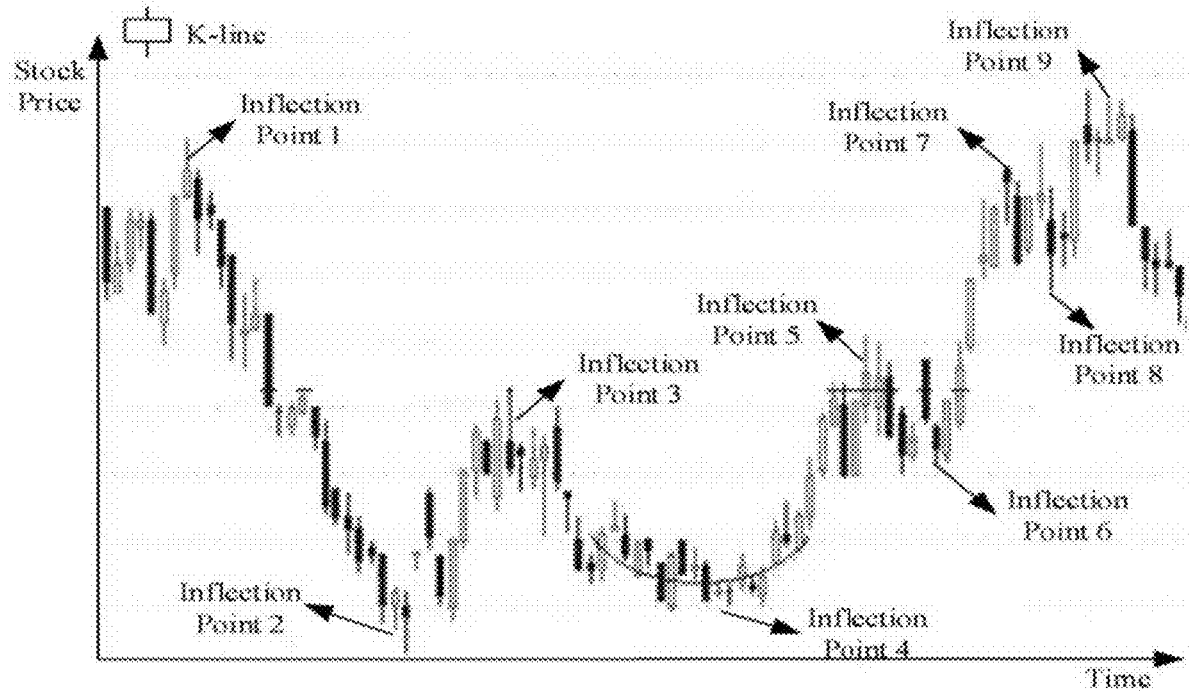
FIG. 4 is a schematic diagram showing an application scenario of another method for identifying a K-line form according to an embodiment of the present disclosure.

Referring to FIG. 4, N1 K-line charts corresponding to the data of the N1 K-lines in the first time window are illustrated, and each K-line chart can be represented by the corresponding time and stock prices. For example, K-line Chart 1=(Time 1, Stock Price 1). The server can identify respective K-line charts in a chronological order. When it is identified that the stock price of a certain K-line changes from high to low or from low to high, the server can determine the K-line as an inflection point, and the corresponding inflection point data includes the time and stock prices indicated by the K-line. As shown in FIG. 4, the server can use the above method to identify that the N1 K-line charts include 9 inflection points which correspond to the inflection point data of the 9 K-lines.

Since the stock price may fluctuate frequently over time, and the magnitude of the fluctuation will also vary, and an inflection point with a relatively small magnitude of fluctuation of stock price (that is, a deviation λ) has substantially no effect on the trend of the stock price over a period of time. Therefore, in some embodiments of the present disclosure, when the server extracts the inflection points from the N1 K-line charts within the first time window, the inflection point data whose deviation λ is smaller than a deviation threshold S can be ignored.

Exemplarily, when it is identified that the stock price deviation λ of a certain K-line is greater than a system-designed deviation threshold S, the server can determine the K-line as an inflection point, or otherwise, the server will not determine the K-line as an inflection point.

Here, the deviation λ can be calculated as follows:

$$\lambda_i = \begin{cases} \left(\frac{v_{i-1}}{z} - z\right) * \left(\frac{v_{i+1} - z}{z} - z\right) & \frac{|v_i - z|}{z} > p \\ 0 & \frac{|v_i - z|}{z} < p \end{cases}$$

where p is a maximum percentage distance threshold, i ranges from 2 to N1-1, $v_i$ is the stock price sequence corresponding to the first time window, and the value of z is calculated as follows:

z is initialized as the K-line data corresponding to the earliest time in the first time window. Each time $\lambda_i$ is determined as an inflection point, z is updated to the K-line data corresponding to the inflection point. That is, z is the K-line data corresponding to the lastest generated inflection point.

Furthermore, it is obtained from experimental data that the accuracy is relatively high when the value range of p is above 15%, where the preferable value of p is 27%.

The value range of the system-designed threshold S is between z and $z^2$, where the preferable value is $(z\sqrt{2}-z)/2$. That is, the deviation threshold S varies with the value of z.

Exemplarily, the data of the a inflection points identified by the server can be recorded as $V^{p1}=((t_1^{p1}, v_1^{p1}), (t_2^{p1}, v_2^{p1}) \ldots (t_a^{p1}, v_a^{p1}))$, where t represents the position of the inflection point in the N1 K-lines, i.e., the t-th K-line at a certain time, and v represents the stock price corresponding to the inflection point.

Further, the server may determine the target form corresponding to the data of the N1 K-lines based on the data of the a identified inflection points. Exemplarily, different K-line form models may be stored in the server in advance, such as to W form model, an arc bottom form model, a reversal doji form model, and so on. For example, any K-line form model can be written as $Y^{p2}=((t_1^{p2}, y_1^{p2}), (t_2^{p2}, y_2^{p2}) \ldots (t_b^{p2}, y_b^{p2}))$, the K-line form model includes b inflection points, and each inflection point can also be represented by the corresponding time and stock price.

Then, the server may calculate similarities between the data of the a identified inflection points and different K-line form models, i.e., calculate similarities between $V^{p1}$ and different $Y^{p2}$. Furthermore, the server may determine the K-line form corresponding to the K-line form model with the highest similarity as the target form for the data of the N1 K-lines.

Figure 5:
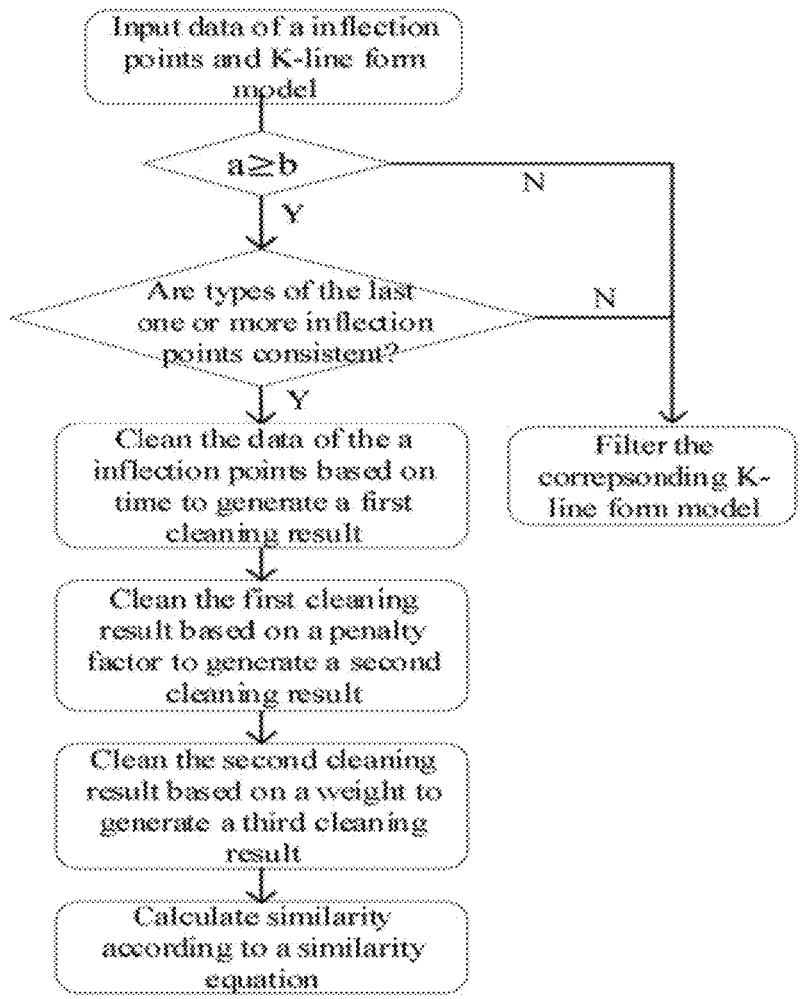
FIG. 5 is a schematic flowchart illustrating a method for identifying a K-line form according to an embodiment of the present disclosure.

Exemplarily, FIG. 5 shows a specific method for calculating the similarity between $V^{p1}$ and the K-line form model $Y^{p2}$, including the following steps:

1) The data of the a inflection points (i.e., $V^{p1}$) and a first K-line form model $Y^{p2}$ are inputted.
2) If a<b, it means that the number of inflection points in the data of the N1 K-lines does not meet the requirement for the number of inflection points in the first K-line form model, and the output will be "inconsistent", that is, the similarity is 0.

If a≥b, it is determined whether the types (rising or falling) of the last inflection points in $V^{p1}$ and $Y^{p2}$ are consistent.

If they are inconsistent, it means that the trend of the data of the N1 K-lines does not match the trend of the first K-line form model, and the output will be "inconsistent", that is, the similarity is 0. Correspondingly, if they are consistent, the process proceeds with the next step.

3) The data of the a inflection points (i.e., $V^{p1}$) is cleaned based on time, and a first cleaning result $V^{p2}$ is generated.

In particular, when performing the first cleaning operation in this embodiment, a time period may be calculated based on the total time length of the K-line price data first, and the data of the a inflection points (i.e., $V^{p1}$) may be sampled based on the time period to obtain data of a(1) samples as the first cleaning result $V^{p2}$, where a(1)≤a. In particular, the time period in this embodiment can be calculated based on the total time length corresponding to the entire K-line price data, e.g., according to:

$$sam = e^{-\eta} \cdot \log_2 T\_dur$$

where η represents the predetermined time factor and η>1, T_dur represents the total time length of the price data, in units of days, hours, minutes, etc., depending on the price data.

4) The first cleaning result $V^{p2}$ is cleaned based on a penalty factor, and a second cleaning result $V^{p3}$ is generated.

Specifically, a penalty threshold and a penalty factor can be predetermined, and each calculated penalty distance can be compared with the penalty threshold. If the penalty distance Dis_pen is greater than the penalty threshold Thr_pen, the corresponding penalty distance is multiplied by the penalty factor Fac_pen and the original price data is updated based on the adjusted penalty distance to obtain data of a(2) samples as the second cleaning result $V^{p3}$, where a(2)≤a(1).

The penalty distance Dis_pen in this embodiment may be a difference between prices corresponding to adjacent time instances in the first cleaning result $V^{p2}$. The first cleaning result can be cleaned to generate the second cleaning result $V^{p3}$ according to:

$$V^{p3} = \begin{cases} V^{p2} + \text{Dis\_pen} \cdot \text{Fac\_pen}; & \text{Dis\_pen} > \text{Thr\_pen} \\ V^{p2}; & \text{Dis\_pen} \leq \text{Thr\_pen} \end{cases}$$

5) The second cleaning result $V^{p3}$ is cleaned based on a weight, and a third cleaning result $V^{p4}$ is generated.

Specifically, in this embodiment, the second cleaning result $V^{p3}$ is cleaned based on a predetermined weight. That is, in the second cleaning result $V^{p3}$, the values greater than or equal to the predetermined weight are retained, and the values smaller than the predetermined weight are deleted. Finally the data of a(3) inflection points is obtained, i.e., the third cleaning result $V^{p4}=\{(t_1^{p4}, v_1^{p4}),(t_2^{p4}, v_2^{p4}), \ldots ,(t_y^{p4},v_y^{p4})\}$.

So far, with Steps 2) to 5), the server can filter inappropriate K-line form models and inaccurate inflection points based on one or more of the number of inflection points, the type of inflection point, the time, the penalty factor, or the weight, and obtain the data of x inflection points that can more accurately reflect the K-line form. Subsequently, the server can calculate the similarities with other filtered K-line form models based on the data of the x inflection points, i.e., Step 6), so as to reduce the computational complexity and difficulty of implementation while ensuring a large number of K-line form models, leading to shorter calculation time and higher accuracy.

6) The similarity between the predetermined K-line form model $Y^{p2}$ and the third cleaning result $V^{p4}$ obtained in Step 5) according to:

$$Sim(V^{p4}, Y^{p2}) = \frac{\sum_1^x (V^{p4} - Y^{p2})}{\sqrt{\sum_1^x V^{p4^2}} \sqrt{\sum_1^x Y^{p2^2}}}$$

After the server calculates the similarities between the data of the a(3) inflection points in $V^{p4}$ and different K-line form models $Y^{p2}$ according to the above method, the form of the K-line form model with the highest similarity can be identified and determined as the target form for the above data of the N1 K-lines. For example, when the similarity between $V^{p4}$ and the K-line form model of the W form is the highest, the server may determine that the target form for the data of the N1 K-lines to be displayed this time is the W form.

In addition, after the server determines the K-line form model with the highest similarity according to the above method, it can also obtain the data of the corresponding x inflection points, where x is smaller than or equal to of a(3). The data of the x inflection points can be used as a part or all of the key K-lines in the data of the N1 K-lines, and the connecting line of the key K-lines can present the target form.

It can be appreciated that those skilled in the art can also use other methods to calculate the similarities between $V^{p1}$ and different K-line form models $Y^{p2}$ depending on actual application scenarios or actual requirements, and the embodiment of the present disclosure is not limited to any of these examples.

At S205, the server transmits the data of the N1 K-lines, the target form, and the identifications of the x key K-lines to the terminal device.

In some embodiments, the server may notify the terminal device of the x K-lines that correspond to the data of the x inflection points in a one-to-one correspondence among the above data of the N1 K-lines as the key K-lines. In this way, the terminal device can present the corresponding target K-line form after connecting the x K-lines.

In some other embodiments, in addition to the x K-lines corresponding to the data of the x inflection points in a one-to-one correspondence, the server may also notify the terminal device of the data of the a(3) inflection points in the above N1 K-lines as key K-lines. It is also possible to notify the terminal device of one or more other K-lines as key K-lines. For example, the x K-lines can be 5 inflection points in the W-shaped K-line form, in addition, the server can also notify the terminal device of one or more other K-lines passing through the W-shaped K-line form among the above N1 K-lines as key K-lines, It can be appreciated that as the number of key K-lines obtained by the terminal device increases, the accuracy of the target form line drawn by the terminal device after connecting the key K-lines will also increase. For example, when the target form line is a curve, the accuracy of the target form line drawn by the terminal device based on 10 key K-lines is generally higher than the accuracy of the target form line drawn by the terminal device based on 5 key K-lines.

In the step S205, the server may transmit the data of the N1 K-lines obtained in the step S203, the target form obtained in the step S204, and the identifications of x key K-lines to the terminal device.

Exemplarily, the server may transmit the data of the N1 K-lines, the target form, and the identifications of the x key K-lines to the terminal device together. Alternatively, the. server may first transmit the data of the N1 K-lines to the terminal device after the step S203, and then transmit the obtained target form and the identifications of the x key K-lines to the terminal device after the step S204. The embodiment of the present disclosure is not limited to any of these examples.

At S206, the terminal device displays the corresponding N1 K-lines according to the data of the N1 K-lines.

Specifically, after receiving the data of the N1 K-lines from the server, the terminal device can display the corresponding N1 K-lines based on the data of the N1 K-lines.

At S207, the terminal device draws a first target form line on the N1 K-lines based on the target form and the x key K-lines.

Figure 6:
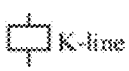
FIG. 6 is a schematic diagram showing an application scenario of another method for identifying a K-line form according to an embodiment of the present disclosure.
Figure 6:
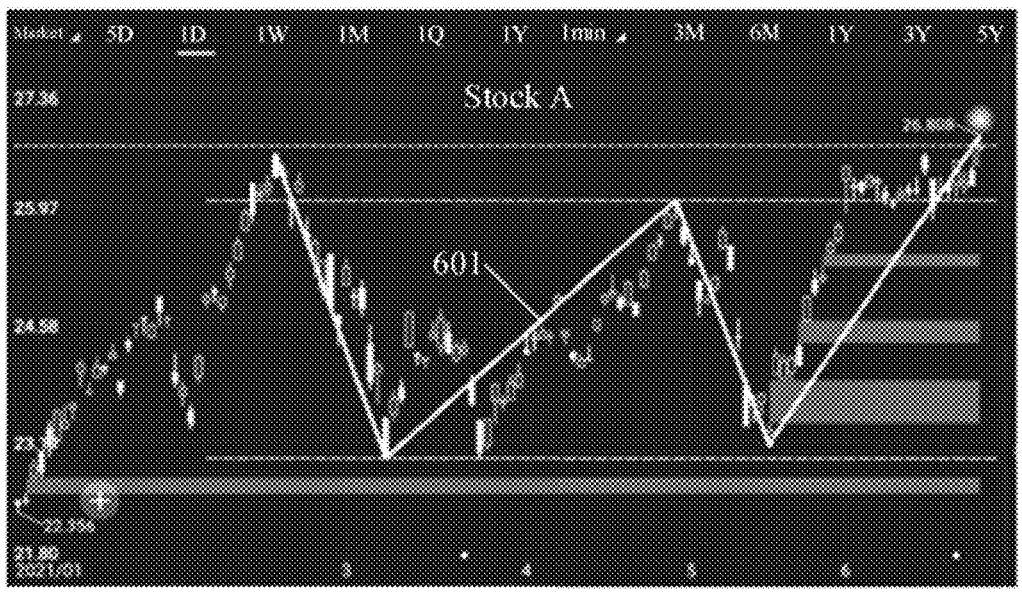

Specifically, in addition to displaying the N1 K-lines in the first time window of Stock A in the step S206, the terminal device may also draw the first target form line on the N1 K-lines based on a target form and the x key K-lines that are transmitted by the server. As shown in FIG. 6, the terminal device can display the N1 K-lines of Stock A in the first time window on the display interface of the stock software. In addition, when the target form is W-shaped, the terminal may sequentially connect the obtained x key K-lines according to the W shape to draw the first target form line 601.

In this way, the terminal device can display the K-line form of the N1 K-lines using the first target form line when displaying the N1 K-lines of a certain stock, thereby helping the user to more effectively identify the K-line contour and enhancing the user's visual experience by effectively combining the K-lines and visual identification.

It is to be noted that the terminal device can display the N1 K-lines and the first target form line at the same time, or it can display the N1 K-lines first and then display the first target form line on the N1 K-lines. The embodiment of the present disclosure is not limited to any of these examples.

At S208, upon detecting that the user touches the first target form line, the terminal device displays detailed data corresponding to the first target form line.

Figure 7:
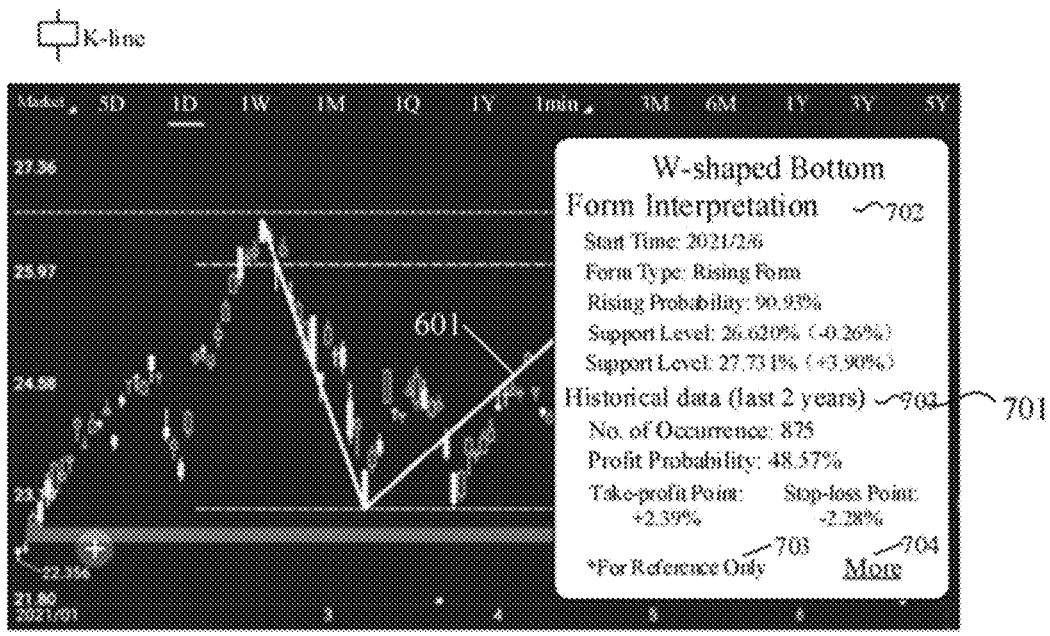
FIG. 7 is a schematic diagram showing an application scenario of another method for identifying a K-line form according to an embodiment of the present disclosure.

Again, taking the first target form line 601 shown in FIG. 6 as an example, after the terminal device displays the first target form line 601 on the N1 K-lines of Stock A, the user can also output a touch operation, such as a single-click operation or a double-click operation, on the first target form line 601. When the terminal device detects that the user touches the first target form line 601, as shown in FIG. 7, the terminal device can display the detailed data 701 corresponding to the first target form line 601.

Exemplarily, the detailed data 701 corresponding to the first target form line 601 may include content such as form interpretation 702, historical backtest 703, disclaimer 704, more guidance 705, etc.

Exemplarily, the form interpretation 701 (for example, for the next three days) may include: starting time, a form type, a rising probability (or a falling probability for a falling form), a resistance level (in a format of Price (±%)), a support level (in a format of Price (±%)), a reversal probability, and the like.

Exemplarily, the historical backtest 703 may include information such as a number of occurrences, a profit probability, a take-profit point (percentage), a stop-loss point (percentage), and the like. Generally, the historical backtest data is backtest data that backtests the latest X years based on the current target form (i.e., the first target form) of same cycle.

The tinting for displaying the above reversal probability (server logic, the terminal controls whether to display according to the server's instruction) may be as follows. When the reversal value is smaller than or equal to "−5" in a rising form, the server can send a high reversal probability field, and when the reversal probability is high, the terminal device may display "the reversal probability is high". When the reversal value is greater than or equal to "+5" in a falling form, the server can send a high reversal probability field, and when the reversal probability is high, the terminal device may display "the reversal probability is high". In addition, the form type, the resistance level, the support level, the take-profit point, and the stop-loss point can support colors for rising and falling, depending on the colors of user's stock for rising and falling.

In this way, when the terminal device detects that the user touches the first target form line, it will display the corresponding detailed data, thereby enhancing the user experience and enhancing the reference value of the K-line chart.

In some other embodiments, the first target form line displayed by the terminal device may be a curve. In this scenario, the terminal device can identify whether the user touches the first target form line using the following scheme.

Specifically, the terminal device may use a form of distributed sample data points to calculate a distance between the user's touch position on the screen and the first target form line.

For example, a start point, an end point, and a control point may be selected, and a second-order Bezier curve may be generated according to the second-order Bezier equation. On this second-order Bezier curve, N sample points can be distributed uniformly. That is, the shortest distance from a point P to a certain second-order Bezier curve can be approximately converted into the shortest distance from the N uniformly distributed points to the point P. Therefore, the determination as to whether a touch point is on a second-order Bezier curve can be converted into the determination as to whether the minimum distance from the point to N points distributed on the second-order Bezier curve meets a predetermined distance.

In addition, based on a distance from a trigger position to a straight line, a point-to-straight-line distance equation can be used to determine whether the touch point is in the response area. Let the equation of a straight line L be $Dx+Ey+F=0$, and the coordinates of a point P be (X0, Y0), then the distance from the point P to the straight line L is:

$$d = \frac{|D_{x_0} + E_{y_0} + F|}{\sqrt{D^2 + E^2}}$$

where D, E, and F are constants that constitute any linear equation.

In the embodiment of the present disclosure, after the terminal device obtains the distance value d from the touch position to the first target form line of the curve type, it can compare the distance value d with a predetermined distance to obtain a comparison result. If the comparison result shows that d is greater than the predetermined distance, it means that the user did not touch the first target form line, and the terminal does not respond. If the comparison result shows that d is smaller than or equal to the predetermined distance, it means that the user touches the first target form line, and the terminal device can display the detailed data corresponding to the first target form line according to the above method.

In other words, when the target form line displayed by the terminal device on the K-lines is a curve, it is also possible to accurately detect whether the user touches the target form line, and then the terminal device is triggered to display the detailed data corresponding to the corresponding target form line, thereby enhancing the user experience.

Figure 8:
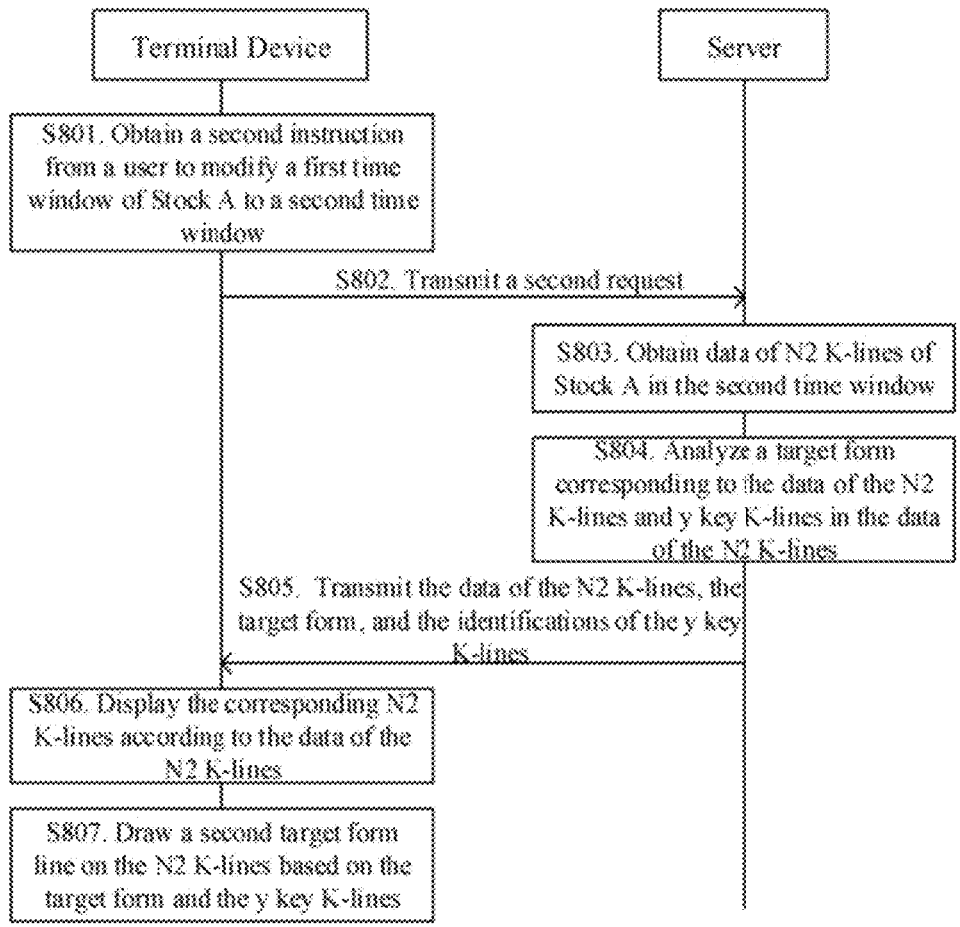
FIG. 8 is a schematic diagram showing interactions in another method for identifying a K-line form according to the present disclosure.

In some embodiments, the user may be allowed to select a suitable time window to determine the K-line farm, which has high flexibility. At the same time, the time dimension is also taken into account in the models, which makes the result more accurate. In this case, as shown in FIG. 8, the terminal device and the server can further perform the following steps.

At S801, the terminal device obtains a second instruction from the user to modify the first time window of Stock A to a second time window.

Figure 9:
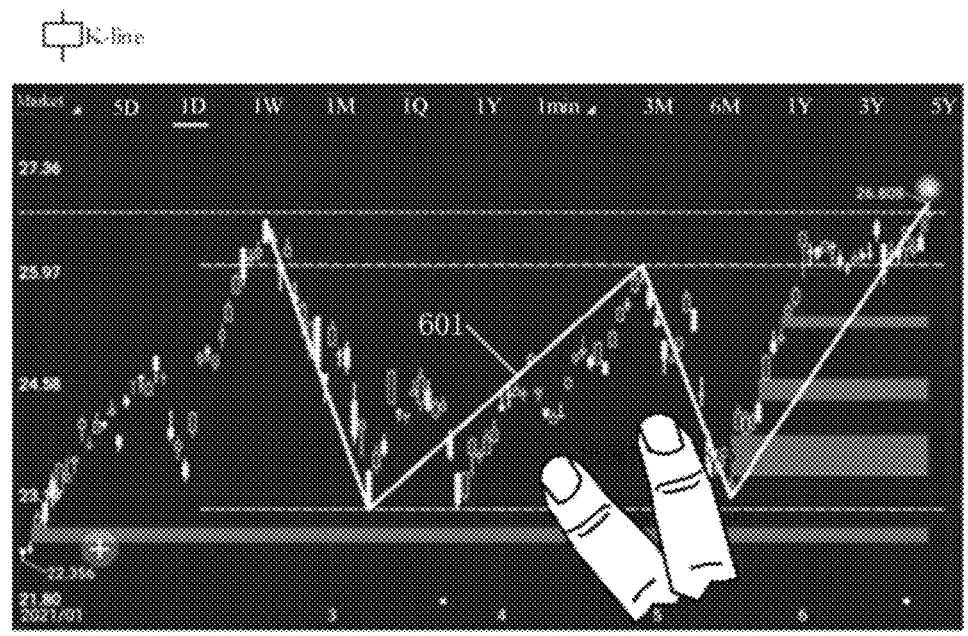
FIG. 9 is a schematic diagram showing an application scenario of another method for identifying a K-line form according to an embodiment of the present disclosure.

Again, taking the terminal device displaying the K-line charts of Stock A as an example, as shown in FIG. 9, the user can manually modify the size of the time window on the K-line charts of Stock A. For example, the user can input a two-finger pinch-in or two-finger pinch-out operation to change the size of the time window. For example, when the terminal device displays the K-line charts of Stock A for the first time, it can display N1 K-lines in the first time window (for example, the last 100 days) by default. Upon detecting that the user inputs a two-finger pinch-in operation on the N1 K-lines, the terminal device can generate a second instruction to modify the first time window to a second time window (for example, the last 30 days).

At S802, in response to the second instruction, the terminal device transmits a second request to the server, the second request including the identification of Stock A and the second time window.

The process for the terminal device to transmit the second request to the server is similar to the process for the terminal device to transmit the first request to the server in the step S202, and thus details thereof will be omitted here.

At S803, the server obtains data of N2 K-lines of Stock A in the second time window, where N2 is an integer greater than 1.

The process for the server to obtain the data of the N2 K-lines of Stock A in the second time window is similar to the process for the server to obtain the data of the N1 K-lines of Stock A in the first time window in the step S203, and thus details thereof will be omitted here.

At S804, the server analyzes a target form corresponding to the data of the N2 K-lines and y key K-lines the data of the N2 K-lines, where y<N2.

The process for the server to analyze the target form corresponding to the data of the N2 K-lines and the y key K-lines in the data of the N2 K-lines is similar to the process for the server to analyze the target form corresponding to the data of the N1 K-lines and the x key K-lines in the data of the N1 K-lines in the step S204, and thus details thereof will be omitted here.

At S805, the server transmits the data of the N2 K-lines, the target form, and the identifications of the y key K-lines to the terminal device.

The process for the server to transmit the data of the N2 K-lines, the target form and the identifications of the y key K-lines to the terminal device is similar to the process for the server to transmit the data of the N1 K-lines, the target form and the identifications of the x key K-lines to the terminal device in the step S205, and thus details thereof will be omitted here.

At S806, the terminal device displays the corresponding N2 K-lines based on the data of the N2 K-lines.

The process for the terminal device to display the corresponding N2 K-lines based on the data of the N2 K-lines is similar to the process for the terminal device to display the N1 K-lines in the step S206, and thus details thereof will be omitted here.

At S807, the terminal device draws a second target form line on the N2 K-lines based on the target form and the y key K-lines.

Figure 10:
FIG. 10 is a schematic diagram showing an application scenario of another method for identifying a K-line form according to an embodiment of the present disclosure.

Similarly to the above step S207, as shown in FIG. 10, the terminal device can display the N2 K-lines of Stock A in the second time window on the display interface of the stock software. In addition, the terminal may sequentially connect the y key K-lines obtained based on the target form transmitted by the server this time to draw the second target form line 1001.

In this way, the user can set a suitable time window depending on his/her own requirements, and trigger the terminal device to display the K-line form of multiple K-lines in the corresponding time window, thereby helping the user to more effectively identify the K-line contour and enhancing the user's visual experience by effectively combining the K-lines and visual identification.

Of course, after the terminal device has drawn the second target form line according to the above method, if it detects that the user touches the second target form line, the terminal device can also display detailed data corresponding to the second target form line according to the method in the step S208. The embodiment of the present disclosure is not limited to this.

In addition, in the above embodiment, the terminal device displays the K-lines and the target form line for Stock A as an example. It can be appreciated that the terminal device can display corresponding target form lines when displaying K-lines of one or more stocks, so as to help the user to more effectively identify the K-line contours.

The method embodiments of the present disclosure have been described in detail above with reference to FIGS. 1 to 10, and the apparatus embodiments of the present disclosure will be described in detail below with reference to FIGS. 11 to 14. It can be appreciated that the apparatus embodiments and the method embodiments correspond to each other, and for detailed descriptions, reference can be made to the method embodiments.

Figure 11:
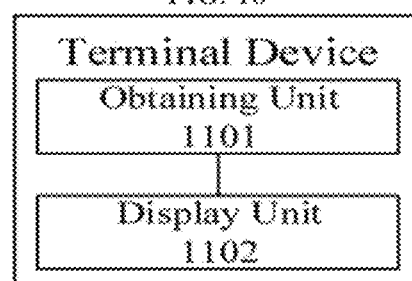
FIG. 11 shows a schematic block diagram of a terminal device according to an embodiment of the present disclosure.

FIG. 11 shows a schematic block diagram of a terminal device according to an embodiment of the present disclosure. As shown in FIG. 11, the terminal device includes:

an obtaining unit 1101 configured to obtain data of N1 K-lines of a first stock in a first time window, where N1 is an integer greater than 1, and obtain a first target form corresponding to the data of the N1 K-lines and x key K-lines in the data of the N1 K-lines, the first target form indicating a K-line form of the data of the N1 K-lines, where x≤N1; and a display unit 1102 configured to display the N1 K-lines corresponding to the data of the N1 K-lines, and draw a first target form line on the N1 K-lines based on the first target form and the x key K-lines.

In some embodiments, the obtaining unit 1101 may be further configured to receive a touch operation by a user on the first target form line.

The display unit 1102 may be further configured to display in response to the touch operation, first detailed data corresponding to the first target form line. The first detailed data includes form interpretation data and historical backtest data for the first target form line.

In some embodiments, the obtaining unit 1101 may be specifically configured to calculate, after detecting a touch point inputted by the user, a distance between the touch point and the first target form line, and determine that the touch operation by the user on the first target form line is received when the distance between the touch point and the first target form line is smaller than or equal to a predetermined distance.

In some embodiments, the display unit 1102 may be specifically configured to connect the x key K-lines according to the first target form to obtain the first target form line.

In some embodiments, the obtaining unit 1101 may be specifically configured to obtain, in response to an operation by a user to open the first stock, the data of the N1 K-lines of the first stock in the first time window from a server.

In some embodiments, the obtaining unit 1101 may be further configured to detect that a user has adjusted the first time window to a second time window; obtain data of N2 K-lines of the first stock in the second time window, where N2 is an integer greater than 1; and obtain a second target form corresponding to the data of the N2 K-lines and y key K-lines in the data of the N2 K-lines, the second target form indicating a K-line form of the data of the N2 K-lines, where y≤N2.

The display unit 1102 may be further configured to display the N2 K-lines corresponding to the data of the N2 K-lines; and draw a second target form line on the N2 K-lines based on the second target form and the y key K-lines.

Figure 12:
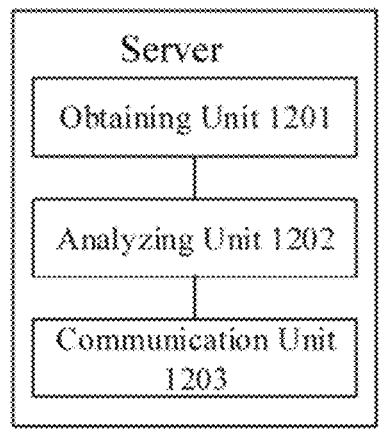
FIG. 12 shows a schematic block diagram of a server according to an embodiment of the present disclosure.

FIG. 12 shows a schematic block diagram of a server according to an embodiment of the present disclosure. As shown in FIG. 12, the server includes:

an obtaining unit 1201 configured to obtain data of N1 K-lines of a first stock in a first time window, where N1 is an integer greater than 1;

an analyzing unit 1202 configured to analyze a corresponding first target form and x key K-lines in the data of the N1 K-lines based on the data of the N1 K-lines, the first target form indicating a K-line form of the data of the N1 K-lines, where x≤N1; and a communication unit 1203 configured to transmit the data of the N1 K-lines, the first target form, and identifications of the x key K-lines to a terminal device.

In some embodiments, the analyzing unit 1202 may be specifically configured to: extract a inflection points of the stock price in the data of the N1 K-lines, where a is an integer greater than 0; calculate similarities between the a inflection points and different K-line form models; and determine a K-line form of the K-line form model with a highest similarity as the first target form.

In some embodiments, the analyzing unit 1202 may be specifically configured to: screen the a inflection points to obtain a(i) screened inflection points, where a(i)≤a; and calculate the similarities between the a(i) inflection points and each of the different K-line form models according to a predetermined similarity equation.

In some embodiments, the analyzing unit 1202 may be specifically configured to: screen the a inflection points based on one or more of: the number of inflection points, an inflection point type, time, a penalty factor, or a weight.

In some embodiments, the communication unit 1203 may be further configured to obtain a first request transmitted by the terminal device, the first request containing an identification of the first stock and the first time window.

In some embodiments, the communication unit 1203 may be further configured to: obtain a second request transmitted by the terminal device, the second request containing an identification of the first stock and a second time window.

The obtaining unit 1201 may be further configured to obtain data of N2 K-lines of the first stock in the second time window, where N2 is an integer greater than 1.

The analyzing unit 1202 may be further configured to analyze a corresponding second target form and y key K-lines in the data of the N2 K-lines based on the data of the N2 K-lines, the second target form indicating a K-line form of the data of the N2 K-lines, where y ≤N2.

The communication unit 1203 may be further configured to transmit the data of the N2 K-lines, the second target form, and identifications of the y key K-lines to the terminal device.

The terminal device and server according to the above embodiments can be configured to implement the solutions described in the above method embodiments with similar implementation principles and achieve similar technical effects, and details thereof will be omitted here.

Figure 13:
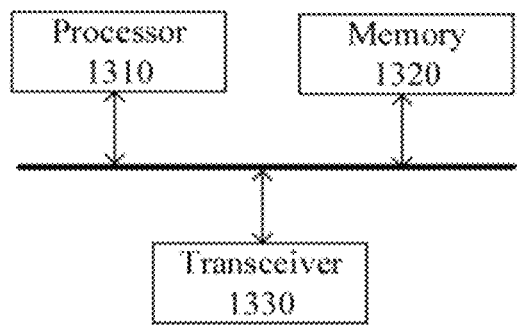
FIG. 13 shows a schematic block diagram of another terminal device according to an embodiment of the present disclosure.

FIG. 13 is a schematic diagram showing a structure of a terminal device according to an embodiment of the present disclosure. The terminal device shown in FIG. 13 includes a processor 1310, and the processor 1310 can invoke and execute a computer program from a memory to perform the method according to any of the embodiments of the present disclosure.

Optionally, as shown in FIG. 13, the terminal device may further include a memory 1320. The processor 1310 can invoke and execute a computer program from the memory 1320 to perform the method according to any of the embodiments of the present disclosure.

The memory 1320 may be a separate device independent of the processor 1310, or may be integrated in the processor 1310.

Optionally, as shown in FIG. 13, the terminal device may further include a transceiver 1330. The processor 1310 can control the transceiver 1330 to communicate with other devices, and in particular to transmit information or data to other devices or receive information or data transmitted by other devices.

Here, the transceiver 1330 may include a transmitter and a receiver. The transceiver 1330 may further include one or more antennas.

Figure 14:
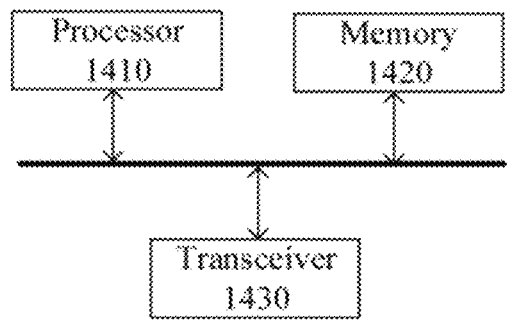
FIG. 14 shows a schematic block diagram of another server according to an embodiment of the present disclosure.

FIG. 14 is a schematic diagram showing a structure of a server according to an embodiment of the present disclosure. The server shown in FIG. 14 includes a processor 1410, and the processor 1410 can invoke and run a computer program from a memory to implement the method in the embodiment of the present disclosure.

Optionally, as shown in FIG. 14 the server may further include a memory 1420. The processor 1410 can invoke and run a computer program from the memory 1420 to implement the method in the embodiment of the present disclosure.

The memory 1420 may be a separate device independent from the processor 1410, or may be integrated in the processor 1410.

Optionally, as shown in FIG. 14, the server may further include a transceiver 1430. The processor 1410 can control the transceiver 1430 to communicate with other devices, and in particular to transmit information or data to other devices or receive information or data transmitted by other devices.

Here, the transceiver 1430 may include a transmitter and a receiver. The transceiver 1430 may further include one or more antennas.

The terminal device and server according to the above embodiments can be configured to implement the solutions described in the above method embodiments with similar implementation principles and achieve similar technical effects, and details thereof will be omitted here.

It is to be noted that the processor in the embodiments of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiments of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium for storing a computer program.

Optionally, the computer readable storage medium can be applied to the terminal device or server in the embodiments of the present disclosure, and the computer program can cause a computer to perform corresponding procedures implemented in the method according to any of the embodiments of the present disclosure. Details thereof will be omitted here for simplicity.

An embodiment of the present disclosure also provides a computer program product including computer program instructions.

Optionally, the computer program product can be applied to the terminal device or server in the embodiments of the present disclosure, and the computer program instructions can cause a computer to perform corresponding procedures implemented in the method according to any of the embodiments of the present disclosure. Details thereof will be omitted here for simplicity.

An embodiment of the present disclosure also provides a computer program.

Optionally, the computer program can be applied to the terminal device or server in the embodiments of the present disclosure. The computer program, when executed on a computer, can cause the computer to perform corresponding procedures implemented in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the devices, apparatuses, and units described above, reference can be made to the corresponding processes in the foregoing method embodiments, and details thereof will be omitted here.

In the embodiments of the present disclosure, it can be appreciated that the disclosed devices, apparatuses, and methods may be implemented in other ways. For example, the apparatus embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between apparatuses or units via some interfaces, which may be electrical, mechanical, or in any other forms.

The units described as separate components may or may not be physically separated, and the components shown as units may or may not be physical units, that is, they may be co-located, or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical units, or two or more units may be integrated into one unit.

When the function is implemented in the form of a software functional unit and sold or used as a standalone product, it can be stored in a computer readable storage medium. With this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A method for identifying a K-line form, comprising:
obtaining, by a terminal device, data of N1 K-lines of a first stock in a first time window, where N1 is an integer greater than 1;
obtaining, by the terminal device, a first target form corresponding to the data of the N1 K-lines and x key K-lines in the data of the N1 K-lines, the first target form indicating a K-line form of the data of the N1 K-lines, where x≤N1, the first target form being a K-line form of a K-line form model with a highest similarity to a inflection points of the data of the N1 K-lines, where a is an integer greater than 0;
displaying, by the terminal device, the N1 K-lines corresponding to the data of the N1 K-lines: and
drawing, by the terminal device, a first target form line on the N1 K-lines based on the first target form and the x key K-lines,
wherein the method further comprises, subsequent to the terminal device drawing the first target form line on the N1 K-lines based on the first target form and the x key K-lines:
receiving, by the terminal device, a touch operation by a user on the first target form line; and
displaying, by the terminal device in response to the touch operation, first detailed data corresponding to the first target form line, the first detailed data comprising form interpretation data and historical backtest data for the first target form line.

2. The method of claim 1, wherein:
the form interpretation data comprises one or more of: start time, a form type, a rising/falling probability, a resistance level, a support level, or a reversal probability, and
the historical backtest data comprises one or more of: a number of occurrences, a profit probability, a take-profit point, or a stop-loss point.

3. The method of claim 1, wherein said receiving, by the terminal device, the touch operation by the user on the first target form line, comprises:
calculating, by the terminal device after detecting a touch point inputted by the user, a distance between the touch point and the first target form line; and
determining, by the terminal device, that the touch operation by the user on the first target form line is received when the distance between the touch point and the first target form line is smaller than or equal to a predetermined distance.

4. The method of claim 1, wherein the first target form line is a straight line or a curved line.

5. The method of claim 1, wherein said drawing, by the terminal device, the first target form line on the N1 K-lines based on the first target form and the x key K-lines, comprises:
connecting, by the terminal device, the x key K-lines according to the first target form to obtain the first target form line.

6. The method of claim 1, wherein said obtaining, by the terminal device, the data of the N1 K-lines of the first stock in the first time window, comprises:
obtaining, by the terminal device in response to an operation by a user to open the first stock, the data of the N1 K-lines of the first stock in the first time window from a server.

7. The method of claim 1, further comprising:
detecting, by the terminal device, that a user has adjusted the first time window to a second time window;
obtaining, by the terminal device, data of N2 K-lines of the first stock in the second time window, where N2 is an integer greater than 1;
obtaining, by the terminal device, a second target form corresponding to the data of the N2 K-lines and y key K-lines in the data of the N2 K-lines, the second target form indicating a K-line form of the data of the N2 K-lines, where $y \leq N2$;
displaying, by the terminal device, the N2 K-lines corresponding to the data of the N2 K-lines; and
drawing, by the terminal device, a second target form line on the N2 K-lines based on the second target form and the y key K-lines.

8. A computer-readable storage medium, configured to store a computer program that enables a computer to perform the method according to claim 1.

9. A method for identifying a K-line form, comprising:
obtaining, by a server, data of N1 K-lines of a first stock in a first time window, where N1 is an integer greater than 1;
extracting, by the server, a inflection points of the stock price in the data of the N1 K-lines, where a is an integer greater than 0;
calculating, by the server, similarities between the a inflection points and different K-line form models, wherein the a inflection points are screened by the server based on one or more of: the number of inflection points, an inflection point type, time, a penalty factor, or a weight; and
determining, by the server, the first target form being a K-line form of a K-line form model with a highest similarity to the a inflection points of the data of the N1 K-lines;
analyzing, by the server, a corresponding first target form and x key K-lines in the data of the N1 K-lines based on the data of the N1 K-lines, the first target form indicating a K-line form of the data of the N1 K-lines, where $x \leq N1$;
transmitting, by the server, the data of the N1 K-lines, the first target form, and identifications of the x key K-lines to a terminal device,
wherein the terminal device is configured to display the N1 K-lines corresponding to the data of the N1 K-lines; and draw a first target form line on the N1 K-lines based on the first target form and the x key K-lines,
wherein the terminal device is further configured to, subsequent to the terminal device drawing the first target form line on the N1 K-lines based on the first target form and the x key K-lines: receive a touch operation by a user on the first target form line; and display, in response to the touch operation, first detailed data corresponding to the first target form line, the first detailed data comprising form interpretation data and historical backtest data for the first target form line.

10. The method of claim 9, wherein said calculating, by the server, the similarities between the a inflection points and the different K-line form models, comprises:
screening, by the server, the a inflection points to obtain a(i) screened inflection points, where $a(i) \leq a$; and
calculating, by the server, the similarities between the a(i) inflection points and each of the different K-line form models according to a predetermined similarity equation.

11. The method of claim 9, further comprising, prior to the server obtaining the data of the N1 K-lines of the first stock in the first time window:
obtaining, by the server, a first request transmitted by the terminal device, the first request containing an identification of the first stock and the first time window.

12. The method of claim 9, further comprising:
obtaining, by the server, a second request transmitted by the terminal device, the second request containing an identification of the first stock and a second time window;
obtaining, by the server, data of N2 K-lines of the first stock in the second time window, where N2 is an integer greater than 1;
analyzing, by the server, a corresponding second target form and y key K-lines in the data of the N2 K-lines based on the data of the N2 K-lines, the second target form indicating a K-line form of the data of the N2 K-lines, where $y \leq N2$; and
transmitting, by the server, the data of the N2 K-lines, the second target form, and identifications of the y key K-lines to the terminal device.

13. A server, comprising a processor and a memory, wherein the memory is configured to store a computer program, and the processor is configured to invoke and execute the computer program stored in the memory to cause the server to perform the method according to claim 9.

14. A computer-readable storage medium, configured to store a computer program that enables a computer to perform the method according to claim 9.

15. A terminal device, comprising a processor and a memory, wherein the memory is configured to store a computer program, and the processor is configured to invoke and execute the computer program stored in the memory to cause the terminal device to:
obtain data of N1 K-lines of a first stock in a first time window, where N1 is an integer greater than 1;
obtain a first target form corresponding to the data of the N1 K-lines and x key K-lines in the data of the N1 K-lines, the first target form indicating a K-line form of the data of the N1 K-lines, where $x \leq N1$, the first target form being a K-line form of a K-line form model with a highest similarity to a inflection points of the data of the N1 K-lines, where a is an integer greater than 0;
display the N1 K-lines corresponding to the data of the N1 K-lines; and
draw a first target form line on the N1 K-lines based on the first target form and the x key K-lines,
wherein the processor is configured to invoke and execute the computer program stored in the memory to cause the terminal device to, subsequent to the terminal device drawing the first target form line on the N1 K-lines based on the first target form and the x key K-lines:
receive a touch operation by a user on the first target form line; and
display, in response to the touch operation, first detailed data corresponding to the first target form line, the first detailed data comprising form interpretation data and historical backtest data for the first target form line.

16. The terminal device of claim 15, wherein:
the form interpretation data comprises one or more of: start time, a form type, a rising/falling probability, a resistance level, a support level, or a reversal probability, and
the historical backtest data comprises one or more of: a number of occurrences, a profit probability, a take-profit point, or a stop-loss point.

17. The terminal device of claim 15, wherein the processor is configured to invoke and execute the computer program stored in the memory to cause the terminal device to:
calculate, after detecting a touch point inputted by the user, a distance between the touch point and the first target form line; and
determine that the touch operation by the user on the first target form line is received when the distance between the touch point and the first target form line is smaller than or equal to a predetermined distance.

18. The terminal device of claim 15, wherein the first target form line is a straight line or a curved line.

* * * * *